US012297035B2

(12) United States Patent
Androsenko

(10) Patent No.: US 12,297,035 B2
(45) Date of Patent: May 13, 2025

(54) HINGE-LID CONTAINER FOR CONSUMER ARTICLES AND A METHOD TO FORM A HINGE-LID CONTAINER

(71) Applicant: Philip Morris Products S.A., Neuchatel (CH)

(72) Inventor: Alexander Androsenko, Boudry (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/558,620

(22) PCT Filed: Apr. 29, 2022

(86) PCT No.: PCT/EP2022/061613
§ 371 (c)(1),
(2) Date: Nov. 2, 2023

(87) PCT Pub. No.: WO2022/233745
PCT Pub. Date: Nov. 10, 2022

(65) Prior Publication Data

US 2024/0228155 A1 Jul. 11, 2024

(30) Foreign Application Priority Data

May 7, 2021 (EP) .................................... 21172846

(51) Int. Cl.

| | |
|---|---|
| ***B65D 85/10*** | (2006.01) |
| ***B31B 50/25*** | (2017.01) |
| ***B31B 100/00*** | (2017.01) |
| ***B31B 120/10*** | (2017.01) |

(52) U.S. Cl.
CPC .......... *B65D 85/1081* (2013.01); *B31B 50/25* (2017.08); *B65D 85/1045* (2013.01);
(Continued)

(58) Field of Classification Search
CPC .......... B31B 2100/00; B31B 2120/102; B31B 2241/003; B65D 5/42; B65D 5/66;
(Continued)

(56) References Cited

U.S. PATENT DOCUMENTS 2,688,649 A 9/1954 Bjorksten
8,720,690 B2 * 5/2014 Ruggiero .............. B65D 85/00 206/459.1

(Continued)

FOREIGN PATENT DOCUMENTS

DE 297 14 385 U1 11/1997
DE 10 2004 027 019 A1 2/2006

(Continued)

OTHER PUBLICATIONS

Han, T. et al., "Laser-Assisted Printed Flexible Sensors: a Review", Sensors, s19061462, 2019, URL: https://wwwww ncbi.nlm.nih_gov/prnc/articles/PMC6471508/, pp. 1-28.

(Continued)

*Primary Examiner* — Bryon P Gehman
(74) *Attorney, Agent, or Firm* — Oblon, McClelland, Maier & Neustadt, L.L.P.

(57) ABSTRACT

A hinge-lid container for consumer articles is provided, the hinge-lid container defining an inner surface and an outer surface and including: a box configured to house the consumer articles; a lid hinged to the box along a hinge and being moveable between a closed position and an active position about the hinge, the hinge including a weakening line realized on the outer surface, the weakening line having a width between 0.1 millimetre and 1 millimetre; and an electric conductive trace provided on the outer surface, the weakening line passing through and interrupting the electric conductive trace, the electric conductive trace forming a closed circuit when the lid is in the active position and (Continued)

forming an open circuit when the lid is in the closed position. A method of forming a hinge-lid container for consumer articles is also provided.

16 Claims, 4 Drawing Sheets

(52) U.S. Cl.
CPC ..... *B31B 2100/00* (2017.08); *B31B 2120/102* (2017.08); *B31B 2241/003* (2013.01); *B65D 2203/12* (2013.01)

(58) Field of Classification Search
CPC ........ B65D 50/25; B65D 51/24; B65D 55/02; B65D 85/10; B65D 85/1045; B65D 85/1081; B65D 2203/12
USPC .................................................. 206/264–268
See application file for complete search history.

(56) References Cited

U.S. PATENT DOCUMENTS

| | | | | |
|---|---|---|---|---|
| 2014/0158574 A1* | 6/2014 | Forbes | B65D 5/42 220/729 |
| 2015/0014708 A1 | 1/2015 | Speier et al. | |
| 2019/0021393 A1 | 1/2019 | Novak et al. | |

FOREIGN PATENT DOCUMENTS

| | | | | |
|---|---|---|---|---|
| EP | 1 485 960 A2 | 12/2004 | |
| EP | 2 314 515 A1 | 4/2011 | |
| EP | 1 485 960 B1 | 6/2011 | |
| EP | 3 034 289 A1 | 6/2016 | |
| WO | WO 03/069700 A2 | 8/2003 | |
| WO | WO 2013/182673 A1 | 12/2013 | |
| WO | WO-2016024002 A1 * | 2/2016 | B65D 85/10 |
| WO | WO 2016/189128 A1 | 12/2016 | |
| WO | WO 2016/189136 A1 | 12/2016 | |

OTHER PUBLICATIONS

International Search Report and Written Opinion Issued Jul. 29, 2022, in PCT/EP2022/061613, filed on Apr. 29, 2022, 10 pages.
Extended European Search Report Issued Oct. 21, 2021 in European Application 21172846.4, 5 pages.
Han, T. et al., "Laser-Assisted Printed Flexible Sensors: A Review", Sensors, s19061462, 2019, URL: https://wwwwww ncbi.nin 71508/, pp. 1-28.

* cited by examiner

HINGE-LID CONTAINER FOR CONSUMER ARTICLES AND A METHOD TO FORM A HINGE-LID CONTAINER

The present invention relates to a hinge-lid container for consumer articles. The invention also relates to a method to form a hinge-lid container.

It is known that in containers for consumer articles, for example in aerosol forming articles' containers, sensors or electronic components can be added. These sensors or components can be for example light sources, sound sources, heating sources, communication elements, humidity sensors, temperature sensors and others. These sensors or components need to be activated only in certain moments of the container's use. For example, a light or a sound source needs to be activated only when the container is opened in order to retrieve the consumer articles housed therein. Furthermore, the sensors and the components may need to be connected to an energy source. The above requirements, in the known containers, in order to be fulfilled, may require complex semiconductors printed on the container or special formats solutions.

It would be desirable to provide a container for consumer articles having sensors or electric or electronic components which are easily energized. It would be desirable to provide a container for consumer articles which can be readily fabricated using existing high speed techniques and apparatus with minimal modifications.

According to an aspect, the invention relates to a hinge-lid container for consumer articles, the container defining an inner surface and an outer surface. Preferably, the hinge-lid container comprises a box for housing the consumer articles. Preferably, the hinge-lid container comprises a lid hinged to the box along a hinge and being moveable between a closed position and an active position about the hinge. Preferably, the hinge comprises a weakening line realized on the outer surface. Preferably, the weakening line has a width of between 0.1 millimetres and 1 millimetre. Preferably, the hinge-lid container comprises an electric conductive trace provided on the outer surface, the weakening line passing through and interrupting the electric conductive trace. Preferably, the electric conductive trace forms a closed circuit when the lid is in the active position and the electric conductive trace forms an open circuit when the lid is in the closed position.

According to another aspect, the invention relates to a hinge-lid container for consumer articles, the container defining an inner surface and an outer surface. The hinge-lid container comprises a box for housing the consumer articles. The hinge-lid container also comprises a lid hinged to the box along a hinge and being moveable between a closed position and an active position about the hinge. The hinge comprises a weakening line realized on the outer surface, the weakening line having a width of between 0.1 millimetres and 1 millimetre. The hinge-lid container also comprises an electric conductive trace provided on the outer surface, the weakening line passing through and interrupting the electric conductive trace. The electric conductive trace forms a closed circuit when the lid is in the active position and the electric conductive trace forms an open circuit when the lid is in the closed position.

The hinge-lid container comprises a box and a lid. Preferably, the box has a box front wall, a box rear wall, box side walls and a box base wall. Preferably, the lid has a lid front wall, a lid rear wall, lid side walls and a lid top wall. The lid is movable from a closed position to an active position, and vice-versa. A lid in the closed position means that the rear wall of the lid and the rear wall of the box are coplanar. In this closed position, therefore, the lid rear wall and the box rear wall form therebetween an angle equal to 180 degrees. Furthermore, when the lid is in the closed position, the electric conductive trace forms an open circuit.

The container defines an inner surface positioned towards the articles and an outer surface facing away from the articles. The lid also defines an inner surface and an outer surface, the outer surface of the lid being those portions of the outer surface of the container belonging to the lid. The box also defines an inner surface and an outer surface, the outer surface of the box being those portions of the outer surface of the container belonging to the box.

The lid is hinged to the box along a hinge, the hinge defining a hinge line, extending across the back wall of the container. The lid can thus rotate about the hinge line. Stating that the lid is in an active position means that the lid rear wall and the box rear wall are not coplanar, and a given angle different from 180 degrees is formed between them. Furthermore, when the lid is in the active position, the electric conductive trace forms a closed circuit. In order to reach the active position, the lid has rotated about the hinge of a given angle from the closed position where the electric conductive trace forms an open circuit. Therefore, with "active position", a plurality of positions where the lid is rotated about the hinge of a given angle are meant. In each position of the plurality of active positions, an angle between the box rear wall and the lid rear wall is different from 180 degrees is present. The angle in the active position formed between the lid rear wall and the box rear wall is preferably smaller than 165 degrees. The angle formed between the lid rear wall and the box rear wall in the active position is preferably smaller than 150 degrees. The angle formed between the lid rear wall and the box rear wall is preferably smaller than 135 degrees. The angle formed between the lid rear wall and the box rear wall in order to have the lid in an active position is preferably comprised between 0 degrees and 165 degrees. When the angle is equal to 0 degrees, the lid rear wall and the box rear wall face each other and the outer surface of the lid rear wall is in contact with the outer surface of the box rear wall.

A first active angle may be defined, as the widest angle formed between the lid rear wall and the box rear wall at which the electric conductive circuit forms a closed circuit. The first active angle is preferably equal to 165 degrees, more preferably equal to 150 degrees, even more preferably equal to 135 degrees.

The lid may also define an "open position", which is a position in which the user may access the articles contained in the container. Preferably, starting from the closed position where the lid rear wall and box rear wall are coplanar, and rotating the lid about the hinge line, the first active position is reached at the first active angle. Continuing to rotate the lid, then the open position is reached, at a second angle between the lid rear wall and the box rear wall, the second angle being smaller than the first active angle.

Preferably, the hinge-lid container may be formed from a blank comprising a plurality of panels. In order to assemble the hinge-lid container, the blank is folded so that panels of the blank can form walls of the container. The way in which the blank is folded depends on the desired geometrical shape of the container. Preferably, a portion of the blank, called lid portion, is folded so that the lid is formed. Preferably, another portion of the blank, called box portion, is folded so that the box is formed. For example, typically, the container has the form of a parallelepiped. Preferably, the blank is folded in such a way that, when the lid is in the closed position, the container defines a completely closed inner volume. In the inner volume, the consumer articles are preferably stored.

The container further comprises a hinge. The hinge defines a hinge line. The lid moves from the open position to the closed position, and vice-versa, about the hinge line. When the lid is in the closed position, there is no rotation of the lid about the hinge line. The lid may rotate around the hinge line till the outer surface of the lid rear wall comes into contact with the outer surface of the box back wall.

According to the invention, the hinge line comprises a weakening line. More preferably, the weakening line comprises an ablated line or a scoring line. The weakening line may be as long as the hinge line. Preferably, the whole hinge line is made in the form of the weakening line. In some embodiments of the invention, the weakening line may only cover a portion of the hinge line, especially on the locations where the electric conductive trace across the hinge line, so that the weakening line may pass through and interrupt the electric conductive trace. Therefore, the weakening line may be shorter than the hinge line. For example, the hinge line may comprise a first portion including an ablated line and a second portion including a creasing line.

Preferably, the weakening line comprises a straight line. Preferably, the weakening line is parallel to the box base wall. Preferably, the weakening line is parallel to the lid top wall.

The weakening line is formed on the outer surface of the container. Preferably, it is formed on the back wall of the container. The weakening line may involve the removal of material from specific locations within the portion of the container back wall that defines the hinge line of the container.

For example, the weakening line may be manufactured by precisely removing material from the back wall of the container with a linear ablation tool (for example, a laser or a cutter). Preferably, the weakening line is an ablated line. Preferably, the ablation is performed by a laser. A laser is a particularly preferred ablation tool, as it is non-invasive and can be digitally programmed for improved flexibility of design. In particular, use of a laser as the ablation tool can allow for a wide variety of ablation profiles and configurations, with minimal adjustment of the laser tool being needed. Repeated passages of the ablation tool over a given portion of the back wall results in the removal of a greater percentage of material, that thus lead to a reduced residual thickness. Thus, the manufacturing process can be simplified. Laser ablation may be obtained using any suitable equipment, preferably a 1000 Watt $CO_2$ laser as commercially available from DIAMOND, for example, the E-1000.

Preferably, a single weakening line is formed. However, more than one weakening line may be formed along the same hinge line at a given distance one another.

Preferably, the weakening line is formed as a substantially V-shaped groove within the container. That is, preferably the weakening line has a substantially V-shaped cross-sectional profile in the back wall, when the lid is in the closed position. The V-shaped is visible taking a cross section of the back wall of the container substantially perpendicular to the outer surface of the back wall. The cross-sectional profile of the ablation lines can be determined using an optical profile as generated by the 2D Non-Contact Surface Metrology, such as the MicroSpy® Profile (commercially available from Fries Research & Technology GmbH, Bergisch Gladbach, Germany).

Furthermore, the width of the weakening line is between 0.1 millimetres and 1 millimetre. More preferably, the width of the weakening line is at least 0.15 millimetres. In addition, or as an alternative, the width of the weakening line may be less than 0.5 millimetres. More preferably, the width of the weakening line is less than 0.3 millimetres. In some preferred embodiments, the width of the weakening line is from 0.1 millimetres to 0.3 millimetres.

The weakening line defines a first edge and second edge, located one in front of the other on the outer surface of the container. The width of the weakening line is measured as the distance between the first edge and the second edge on the outer surface of the container. The width of the weakening line is measured when the lid is in the closed position. In this position, the width of the weakening line is at the maximum. This is the position in which the width of the weakening line is to be measured. The width of the weakening line can be determined using an Optical Profilometer for 2D and 3D Non-Contact Surface Metrology, such as the MicroSpy® Profile (commercially available from Fries Research & Technology GmbH, Bergisch Gladbach, Germany). Preferably, several distances between the first edge and the second edge are measured over the length of the weakening line. The measurement are evenly spread over the length of one weakening line and the arithmetic mean is calculated. Thus the width of the weakening line is the arithmetic mean of several distances measured along the length of the weakening line. Preferably, between the first edge and the second edge, the weakening line defines a groove, where the material of the back wall of the container has been removed.

Preferably, the width of the weakening line is to be measured when the weakening line is formed on the blank, before the blank is folded to form the container.

When the lid is moved from the closed position to the active position, the rotation of the lid about the hinge gradually closes the weakening line. Due to the lid rotation, the width of the weakening line continuously reduces till the first edge comes into contact to the second edge. The contact between the first edge and second edge may take place at the first active angle and for angles smaller than the first active angle.

Preferably, the weakening line has a minimum residual thickness of less about 40 percent of the thickness of the back wall of the container. Preferably, the weakening line has a minimum residual thickness of less about 40 percent of the thickness of the blank forming the container. Preferably, the weakening line has a minimum residual thickness of at least about 20 percent of the thickness of the back wall (or the blank) of the container.

The residual thickness of the weakening line can be determined using an Optical Profilometer for 2D and 3D Non-Contact Surface Metrology, such as the MicroSpy® Profile (commercially available from Fries Research & Technology GmbH, Bergisch Gladbach, Germany). Preferably, several points of minimum residual thickness are measured over the length of a weakening line whereas the points of measurement are evenly spread over the length of one weakening line and the arithmetic mean is calculated. Even more preferably, to obtain the “minimum residual thickness” according to the present invention, five measurements, evenly spread over the length of a weakening line, are performed and then the arithmetic medium is calculated.

For example, if the length of the weakening line is 80 millimetres, the residual thickness is measured at both ends of the weakening line and at three further points distanced 20 millimetres, 40 millimetres and 60 millimetres respectively from one end of the weakening line.

Further, on the back wall of the container, an electric conductive trace is formed. Preferably, the electric conductive trace is formed on the lid rear wall and on the box rear wall. The electric conductive trace preferably defines a circuit which is shaped depending on the needs. The electric conductive trace is formed on the outer surface of the container. A single electric conductive trace or more than one electric conductive trace may be formed.

Preferably, the electric conductive trace is formed by a technique to produce printed electronics. The selected technique preferably uses common printing equipment suitable for defining patterns on the container. The pattern created by the electric conductive trace printed on the container depends on the desired type of circuit to be formed. Possible techniques to form the electric conductive trace on the container are for example screen printing, flexography, gravure, offset lithography, and inkjet printing. In any of these printing techniques, electrically functional electronic or optical inks are deposited on the outer surface of the container. In this way, conductive traces may be formed.

For example, an electrical conductive trace is formed by moving a print head, equipped with a mechanical stop/start shutter, relative to the container.

Preferably, the formation of the electric conductive trace takes place on the blank, before the blank is folded to form the container.

The electric conductive trace is interrupted by the weakening line. The weakening line passes through the electric conductive trace and divides the electric conductive trace into two parts. Preferably, a first part of the electric conductive trace is located on the outer surface of the lid rear wall and a second part of the electric conductive trace is located on the outer surface of the box rear wall. When the lid is in the closed position, the width of the weakening line is at its maximum, and no electrical current can flow between the first part of the electric conductive trace and the second part of the electric conductive trace due to the interruption. The circuit formed by the electric conductive trace is open. Therefore when the lid is in the closed position, the lid rear wall and the box rear wall are substantially coplanar, a flow of an electrical current cannot circulate in the electric conductive trace, due to the interruption caused by the weakening line.

However, when the lid is moved from the closed position to the active position, the first part and second part of the electric conductive trace which have been separated by the weakening line are brought into contact. By the rotation of the lid about the hinge line, the weakening line is compressed and the first edge of the weakening line and the second edge of the weakening line are brought into a configuration where the two edges touch each other. The width of the weakening line becomes substantially equal to zero. In the active position of the lid, there is contact between the first part of the electric conductive trace and the second part of the electric conductive trace which were divided by the weakening line, and the electric conductive trace creates a closed circuit so that electrical current can flow.

The width of the weakening line is so selected that a reliable contact between the first part of the electric conductive trace and the second part of the electric conductive trace is possible when moving the lid from the closed position to the active position and vice-versa. The action of the rotation of the lid can be compared to the action of a "switch". When the lid is in the closed position, the circuit is open. Rotating the lid, the switch is turned on and the circuit is closed.

The electrical continuity between the first part of the electric conductive trace and the second part of the electric conductive trace when the lid is in the active position is also enhanced by the way in which the deposition of the conductive material on the back wall of the container preferably takes place. In the deposition, the material forming the electric conductive trace tips over the first edge and the second edge of the weakening line, "reducing" the distance and increasing a contact surface, and thus a better contact between the first part and second port is possible. When the electric conductive trace is formed, the material forming the electric conductive trace may "spill out" inside the V-shaped groove defined by the weakening line. The limited flow of material forming the electric conductive trace in the V-shaped groove from the first edge and second edge of the weakening line may take place for example when the electric conductive line is deposited. The electric conductive trace thus extends in the groove for a length of about 1 micrometres or 2 micrometres from the first edge and from second edge, respectively. These portions of material forming the electric conductive trace tipped over the edges of the groove defined by the weakening line increase a contact surface between the first part of the electric conductive trace and the second part of the electric conductive trace when the lid is in an active position. Therefore, a better contact between the two parts of the electric conductive trace is secured.

The container according to the invention therefore allows opening and closing a circuit simply by rotating the lid with respect to the box. By a rotation of the lid about the hinge, the circuit formed by the electric conductive trace moves from an open configuration when the lid is closed to a closed configuration when the lid is in an active position in a very simple and reliable manner.

Furthermore, the circuit can be used for a plurality of purposes based on the same working principle.

The container of the invention can be formed only slightly modifying the standard processes used for the formation of the containers known in the industry. Little additional costs are therefore necessary for the modification of the already used blanks and machinery.

According to another aspect, the invention relates to a method to form a hinge-lid container for consumer articles. Preferably, the method comprises the step of: providing a container blank defining an outer surface and an inner surface, and wherein the container blank comprises a box portion for forming a box and a lid portion for forming a lid. Preferably, the method comprises the step of: forming a weakening line on the outer surface having a width of between 0.1 millimetres and 1 millimetre, the weakening line forming a hinge for the lid so that the lid is movable from a closed position to an active position on the box. Preferably, the method comprises the step of: providing an electric conductive trace on the outer surface, including providing the electric conductive trace across the weakening line. Preferably, the method comprises the step of: folding the blank to form the hinge-lid container, wherein the electric conductive trace forms a closed circuit when the lid is in the active position and the electric conductive trace forms an open circuit when the lid is in the closed position.

According to another aspect, the invention relates to a method to form a hinge-lid container for consumer articles. The method comprises the step of: providing a container blank defining an outer surface and an inner surface, wherein the container blank comprises a box portion for forming a box and a lid portion for forming a lid. The method also comprises the step of: forming a weakening line on the outer surface having a width of between 0.1 millimetres and 1 millimetre, the weakening line forming a hinge for the lid so that the lid is movable from a closed position to an active position on the box. The method also comprises the step of: providing an electric conductive trace on the outer surface, including providing the electric conductive trace across the weakening line. The method also comprises the step of: folding the blank to form the hinge-lid container, wherein the electric conductive trace forms a closed circuit when the lid is in the active position and the electric conductive trace forms an open circuit when the lid is in the closed position.

Many of the advantages of the method have been already outlined when describing the container of the invention and are not repeated herewith.

According to the invention, the weakening line is realized on a blank, called a container blank, preferably before folding the blank. Preferably, first the weakening line is formed, then the electric conductive trace is provided. Preferably, after the weakening line and the electric conductive trace are formed, then the blank is folded so as to form the container. The electric conductive trace is formed preferably after the weakening line is formed, because in this way an excess of the material forming the electric conductive trace tips beyond the edges of the weakening line. This "tipping over" may be realized during the printing process upon depositing the material over the weakening line. The tipped over excess of the material forming the electric conductive trace forms a leading edge of the electric conductive trace and a tailing edge of the electric conductive trace at the first part of the electric conductive trace and at the second part of the electric conductive trace, respectively. A reliable contact between the first part and second part of the electric conductive trace can be thus obtained. The first part ends with the leading edge and the second part begins with the tailing edge.

Furthermore, the width of the weakening line is so selected that the material forming the electric conductive trace does not enter, or enter only partly, into the weakening line. In this way, when the lid is in the closed position, the circuit formed by the electric conductive trace is open.

Preferably, the container is at least partly formed by folding a blank. Preferably, the blank is a laminar blank. The blank is preferably a conventional blank used in the production of containers for consumer articles, for example, a standard blank for making a hinge-lid cigarette pack. No special materials are needed in the invention, the starting materials are the standard material in the technical field.

More preferably, the lid and the body are formed by folding the same blank. Preferably, the blank has a body portion and a lid portion, connected to each other. Folding these portions, a container having a lid and a box is formed. The folding of the blank in a hinge-lid container is preferably known in the art. In some preferred embodiments, the blank forms at least a part of the container comprising a box portion having a box front wall, a box rear wall and box side walls extending between the box front wall and the box rear wall. In addition, or in alternative embodiments, the blank preferably forms at least a part of the container comprising a lid portion having a lid front wall, a lid rear wall and lid side walls extending between the lid front wall and the lid rear wall.

Preferably, the thickness of the blank is from 200 micrometres to 400 micrometres. More preferably, the thickness of the blank is from 260 micrometres to 340 micrometres. More preferably, the thickness of the blank is comprised between 280 micrometres to 320 micrometres. The thickness of the blank can be measured in accordance with ISO 534:201 1.

The blank is preferably a cellulose-fibre-based blank. Preferably, the blank is formed from cardboard or paperboard. Preferably, the cellulose-fibre based material is plant-derived and more preferably wood-derived. The blank may contain at least 50 percent by weight, preferably at least 60 percent by weight, and even more preferably at least 70 percent by weight of cellulose fibres based on the total fibre content of the blank. Preferably, the blank is formed from wood-fibres cardboard or paperboard. Alternatively, the cellulose-fibre based material may also contain other fibres, such as polymer fibres. The blank may be coated or uncoated and preferably is coated on both sides.

The container may optionally comprise an outer wrapper, which is preferably a transparent polymeric film of, for example, high or low density polyethylene, polypropylene, oriented polypropylene, polyvinylidene chloride, cellulose film, or combinations thereof and the outer wrapper is applied in a conventional manner. The outer wrapper may include a tear tape. In addition, the outer wrapper may be printed with images, consumer information or other data.

Preferably, the blank has a basis weight of between about 100 grams per square metre and about 350 grams per square metre. In some preferred embodiments, the blank has a basis weight of from about 160 grams per square metre to about 240 grams per square metre. It is understood, that these ranges represent average values and that the basis weight of the blank may vary between several batches, e.g. plus ten percent or minus ten percent, preferably plus 5 percent or minus five percent.

Preferably, the container comprises a back wall having a thickness, the weakening line being formed in the back wall, and wherein the weakening line has a depth comprised between 30 percent and 80 percent of the thickness of the back wall. The depth of the weakening line is preferably comprised between 40 percent and 70 percent of the thickness of the back wall of the container. The back wall comprises the lid rear wall and the box rear wall. The lid rear wall and box rear wall are substantially coplanar when the lid is in the closed position. Further, the thickness of the back wall is substantially the thickness of the blank. If the weakening line is too deep, the hinge line may become fragile and may break during use. If the weakening line is too shallow, the tension still present when the board is bend about the weakening line may hinder a proper closure of the circuit.

Preferably, the container comprises an energy source. Preferably, the container comprises an electric load. Preferably, the electric load includes a light source. Preferably, the electric load includes a sensor. Preferably, the electric load includes an antenna. Preferably, the electric load includes a heating element. Preferably, the electric load includes an acoustic emitter. Preferably, the electric conductive trace, when forming a closed circuit, connects the energy source to the electric load. Preferably, the container comprises more than one electric load. Preferably, the container comprises more than one energy source. Preferably, the electric source included in the container is a battery. The battery may be a printed battery, realized for example according to U.S. Pat. No. 2,688,649 or EP 1485960. The energy source may be rechargeable or non-rechargeable. The electric source may include a solar panel. The energy source may include a charged condenser. The energy source may be located inside the container. The energy source may therefore use some of the volume present inside the container, for example together with the consumer articles. The energy source may be located outside the container, for example connected to the outer surface of the container. The energy source may be formed using the same technique used to form the electric conductive trace. For example, the energy source may be printed on the outer surface of the container. The energy source is preferably used to energize an electric load. The electric load and the energy source are connected via the electric conductive trace. Preferably, the electric conductive trace forms a circuit connecting the energy source to the electric load.

For example, the energy source may be located on the box portion of the container, while the electric load may be located on the lid portion of the container, or vice-versa.

The electric load may be located inside the container. The electric load may therefore use some of the volume present inside the container, for example together with the consumer articles. The electric load may be located outside the container, for example connected to the outer surface of the container. The electric load may be formed using the same technique used to form the electric conductive trace. For example, the electric load may be printed on the outer surface of the container.

The electric load may be for example a light source. Thus, when the lid is moved from the closed position to the active position, the light source may emit electromagnetic radiation. The light source might include a LED.

The electric load may be for example a sensor. Thus, when the lid is moved from the closed position to the active position, the sensor may sense a pre-defined parameter in the surrounding of the container. The sensor may include a temperature sensor. The sensor may include a humidity sensor.

The electric load may be for example an antenna. Thus, when the lid is moved from the closed position to the active position, the antenna may send a signal to an external receiver. The receiver is preferably external to the container. The signal may be relative to a parameter measured by the sensor. The signal may be relative to a status of the container. The antenna may include a microstrip antenna or a printed antenna.

The electric load may be for example a heating element. Thus, when the lid is moved from the closed position to the active position, the heating element starts producing heat. Heating of the container may be useful in cold environments.

The electric load may be for example an acoustic emitter. Thus, when the lid is moved from the closed position to the active position, the acoustic emitter may emit a sound. The emitter may be first activated as a consequence of a trigger signal and only after activation a sound is emitted when the lid is opened. The number of consumer articles used in given time period may be counted.

Preferably, the electric conductive trace has a grammage comprised between 1 gram per square meter and 50 gram per square metre. Preferably the electric conductive trace has a grammage comprised between 1 gram per square meter and 20 gram per square metre. Preferably, the electric conductive trace has a width comprised between 0.1 millimetres and 25 millimetres.

Preferably, the electric conductive trace has a width comprised between 0.3 millimetres and 5 millimetres. The width and grammage of the electric conductive trace are measured when the electric conductive trace is dry. For example, if the electric conductive trace is printed, the ink deposited on the outer surface of the container is initially wet. The mentioned measures are taken when the ink is dry.

The width of the electric conductive trace is measured using the same method used to measure the width of the weakening line.

Preferably, the electric conductive trace comprises conductive ink. More preferably, the conductive ink comprises one or more of: conductive carbon, carbon nanotubes, graphene, silver, copper, indium tin oxide, conductive polymer. Conductive ink is an ink that results in a printed object which conduct electricity. Conductive inks are relatively economical and work very well in materials like cardboard, plastic or anyhow flexible materials. Conductive ink allows creating electric circuits also on flexible materials.

Preferably, the container comprises a back wall and a top wall, and the electric conductive trace is printed on the back wall or on both of the back wall and the top wall. The electric circuit is formed partly on the lid and partly on the box so that the ablation line may act as a "switch" when the lid alternates between the active position and the closed position.

Preferably the weakening line has a length longer than 0.1 millimetres. The length of the weakening line is longer than the width of the electric conducive trace because it has to interrupt the electric conductive trace completely. The maximum length of the weakening line is a length equal to the length of the hinge, which is substantially the width of the container.

Preferably, a leading edge of the electric conductive trace and a tailing edge of the electric conductive trace on the respective first part of the electric conductive trace and the second part of the electric conductive trace define a gap, the width of the gap being smaller than the width of the weakening line. Preferably, in the blank, first the weakening line is formed. Then, the electric conductive trace is formed on the blank where the weakening line has been created. The electric conductive trace is also formed on top of the weakening line. Due to the dimensions of the width of the weakening line, the material forming the electric conductive trace does not enter in the weakening line and remains on the outer surface of the container. However, from the first edge and at the second edge of the weakening line, the material forming the electric conductive trace slightly tips over the first edge and the second edge of the weakening line and therefore forms a leading edge of the electric conductive trace and a tailing edge of the electric conductive trace on the respective first part of the electric conductive trace and the second part of the electric conductive trace. The space between the leading edge of the material forming the electric conductive trace on one side of the weakening line and the tailing edge of the conductive trace on the other side of the weakening line is called "gap". The width of this gap is smaller than the width of the weakening line. The width of the gap is equal to the distance between the first part and the second part of the electric conductive trace The gap is thus narrower than the width of the weakening line.

Preferably, the step of forming a weakening line comprises ablating the outer surface of the container. More preferably, the step of ablating the outer surface of the container includes: ablating the outer surface by a laser beam. The blank of the present invention may advantageously be manufactured by precisely removing material from the blank with a linear ablation tool (for example, a laser or a cutter). A laser is a particularly preferred ablation tool, as it is non-invasive and can be digitally programmed for improved flexibility of design.

Preferably, the method comprises the step of energizing a load when forming a closed circuit. Preferably, the electric conductive trace forms a circuit and the lid has the function of a “switch”: when in the active position, the lid closes the circuit; when in the closed position, the lid opens the circuit. The circuit is preferably used to bring electrical current to a load, which can be any electric load. Examples of electric loads have been given above. Preferably, the electric load and the electric conductive trace are formed using the same technique. Preferably, the electric load is printed on the outer surface of the container.

Preferably, the method of the invention comprises the step of switching on a light source when forming the closed circuit. Preferably, the method of the invention comprises the step of emitting a sound when forming a closed circuit. Preferably, the method of the invention comprises the step of emitting a telecommunication signal when forming a closed circuit. Preferably, the method of the invention comprises the step of heating the container when forming a close circuit. Preferably, the method of the invention comprises the step of sensing a parameter when forming a closed circuit. Preferably, the method may comprise two steps among: switching on a light source when forming the closed circuit; emitting a sound when forming the closed circuit; emitting a telecommunication signal when forming the closed circuit; heating the container when forming the closed circuit; sensing a parameter when forming the closed circuit. Preferably, the method comprises three of the above mentioned steps. Preferably, the method comprises all the above steps.

Preferably, the method comprises the step of providing the container with an energy source. Preferably, the energy source and the electric conductive trace are formed using the same technique. Preferably, the electric load and the electric conductive trace are formed using the same technique. Preferably, the energy source is printed on the outer surface of the container.

Preferably, the step of forming a closed circuit from the electric conductive trace when the lid is in the active position includes: forming an angle smaller than 165 degrees between a lid rear wall and a box rear wall. The back wall of the container is formed by the lid rear wall and the box rear wall. When the lid is in the closed configuration, the lid rear wall and the box rear wall are substantially coplanar, so the angle that is formed between the plane defined by the box rear wall and the plane defined by the lid rear wall is substantially equal to 180 degrees. When the lid rotates about the hinge, this angle decreases, because the plane defined by the lid rear wall becomes tilted with respect to the plane defined by the box rear wall. When the lid is in the completely open configuration, the box rear wall faces the lid rear wall and the mentioned angle becomes substantially equal to 0 degrees. The lid rear wall and the box rear wall therefore can form any angle between 0 degrees and 180 degrees. When the angle is smaller than 165 degrees, then the first part and the second part of the electric conductive trace come into contact and the circuit is closed. Preferably, the angle is smaller than 150 degrees.

The “thickness” of the blank is the thickness of the blank after it has been manufactured, but before any ablation lines or creasing lines have been formed in the blank. That is, the thickness of the blank is the thickness in any region of the blank not containing an weakening line or a crease line.

The term “residual thickness” is used herein to refer to the minimum distance measured between two opposite surfaces of the laminar blank or of a wall of the container formed from the blank. In practice, the distance at a given location is measured along a direction locally perpendicular to the opposite surfaces. The residual thickness of the weakening line may vary across a width of the weakening line, (for example, V-shaped, U-shaped grooves).

The term “minimum residual thickness” is used herein to refer to the smallest value of “residual thickness” measured in an weakening line at a given location.

The terms “cellulose-fibre-based blank” is used herein to refer to a blank comprising at least 50 percent by weight of cellulose fibres, based on the total fibre content of the blank. The cellulose-fibre-based or wood-fibre-based blank of the invention may include other types of fibres, such as polymer fibres.

Containers realized according to the invention find particular application as containers for elongate aerosol-generating articles such as, for example, cigarettes, cigars, cigarillos or other aerosol generators that rely on heating rather than burning tobacco, for example through an electrical heat source or carbon heat source. It will be appreciated that through appropriate choices of the dimensions thereof, containers according to the invention may be designed for different numbers of conventional size, king size, super-king size, slim or super-slim aerosol generating articles. Alternatively, other consumer articles may be housed inside the container.

Containers formed according to the invention may be in the shape of a rectangular parallelepiped, with right-angled longitudinal and right-angled transverse edges. Alternatively, the container may comprise one or more rounded longitudinal edges, rounded transverse edges, bevelled longitudinal edges or bevelled transverse edges, or combinations thereof. Alternatively, the container may have a non-rectangular transversal cross section, for example polygonal such as triangular or hexagonal, semi-oval or semi-circular.

Typically, the outer dimensions of the container are between about 0.5 mm to about 5 mm larger than the dimensions of the bundle or bundles of aerosol-generating articles housed inside the container.

Preferably, containers according to the invention have a height of between about 60 millimetres and about 150 millimetres, more preferably a height of between about 70 millimetres and about 125 millimetres, wherein the height is measured from the bottom wall to the top wall of the container. Preferably, containers according to the invention have a width of between about 12 millimetres and about 150 millimetres, more preferably a width of between about 70 millimetres and about 125 millimetres, wherein the width is measured from one side wall to the other side wall of the container.

Preferably, containers according to the invention have a depth of between about 6 millimetres and about 150 millimetres, more preferably a depth of between about 12 millimetres and about 25 millimetres wherein the depth is measured from the front wall to the back wall of the container (comprising the hinge between box and lid).

Preferably, the ratio of the height of the container to the depth of the container is in between about 0.3 to 1 and about 10 to 1, more preferably between about 2 to 1 and about 8 to 1, most preferably between about 3 to 1 and 5 to 1.

Preferably, the ratio of the width of the container to the depth of the container is in between about 0.3 to 1 and about 10 to 1, more preferably between about 2 to 1 and about 8 to 1, most preferably between about 2 to 1 and 3 to 1.

Where the container comprises aerosol-generating articles, the container may further comprise waste-compartments (for example for ash or butts) or other consumer goods, for example matches, lighters, extinguishing means, breath-fresheners or electronics. The other consumer goods may be attached to the outside of the container, contained within the container along with the aerosol-generating articles, in a separate compartment of the container or combinations thereof.

The term "inner surface" is used throughout the specification to refer to the surface of a component of the assembled container that is facing towards the interior of the container, for example towards the consumer goods, when the container is in the closed position. The term "outer surface" is used throughout the specification to refer to the surface of a component of the container that is facing towards the exterior of the container. For example, the front wall of the container has an inner surface that is facing the inside of the container and the consumer goods, and an outer surface facing away from the consumer goods. It should be noted that the inside or outside surface is not necessarily equivalent to a certain side of a blank used in the assembly of the container. Depending on how the blank is folded around the consumer goods, areas that are on the same side of the blank can either face towards the inside or the towards the outside of the container.

As used herein, the terms "front", "back", "upper", "lower", "top", "bottom" and "side", refer to the relative positions of portions of containers according to the invention and components thereof when the container is in an upright position with the access opening of the container at the top of the container. When describing containers according to the present invention, these terms are used irrespective of the orientation of the container being described. The back wall of the outer hinge-lid housing is the wall comprising the hinge line.

When describing a container in accordance with the present invention, the term "longitudinal" refers to a direction from bottom to top or vice versa, whereas the term "transverse" refers to a direction perpendicular to the longitudinal direction. For example, a "longitudinal axis of the container" is an axis extending from bottom to top or vice versa.

The term "width" is used to describe the dimension of an element, such as a panel of a blank or a wall of a container as measured in the transverse direction.

The term "panel" is used throughout this specification to refer to a portion of the blank that is used to form a wall in the assembled container. A panel may depend along one or more fold lines from one or more other panels.

In the assembled container a "wall" may be formed of one or of several overlying panels. Where there are several overlying panels, these may be attached to each other, for example by means of an adhesive. Further, a wall may be formed from two or more abutting or overlapping panels.

The term "thickness" is used herein to refer to the minimum distance measured between two opposite surfaces of the sheet blank or of a layer of the sheet blank. In practice, the distance at a given location is measured along a direction locally perpendicular to the opposite surfaces. The "thickness" of layer will generally be substantially constant over the layer (flat profile). However, local variations may be possible where portions of the sheet blank are, for example, embossed, debossed, weakened, and so forth.

The term "hinge line" refers to a line about which the lid may be pivoted in order to open the hinge-lid housing. A hinge line is a weakening line. A hinge line may be, for example, a fold line or a score line in the panel forming the back wall of the container.

The term "weakening line" is used herein to describe a portion of a surface of the container or package (or the blank from which the container or package is formed) wherein the structural strength of the material, from which the container or package (or blank) is formed has been weakened by any suitable technique, for example with respect to bending, folding or tearing along the line of weakness. For example, a line of weakness may be formed as a scoring line, a creasing line, an ablation line, or a perforation line. Lines of weakness can be created by removal of material, by displacement of material, by compression of material, by locally reducing the forces that hold the material together, such as by breaking fibres in a fibrous material, as well as by combinations of all the above. A line of weakness may be straight, curved, segmented or continuous or a combination thereof. In many instances, a line of weakness is used to assist in positioning a fold line in a blank. A line of weakness can also be used to strengthen the material in a direction perpendicular to the line of weakness, for example by compression. Further, a line of weakness can be used for decorative purpose.

The term "ablated line" is used herein to refer to a line along the inner surface of the edge portion from which material has been ablated (for example, removed by means of a laser beam or a cutter). Accordingly, the residual thickness of an ablated line is less than the thickness of the laminar blank. The ablated line is preferably provided as a groove within the blank. This may be formed with a linear ablation tool, such as a laser or a cutter. "Ablated" lines encompass in their meaning also scoring lines when they include removal of material.

The term "scoring line" is used to describe a line formed by partially cutting into the material of the blank. A scoring line may be formed by removing material from the blank (in which case the scoring line forms a groove or trough in the blank).

The term "perforated line" is used to describe a line or sequence of discrete holes or slots in the blank. The holes may be formed by pushing an object through the blank. This may result in material being removed from the blank, for example by punching. Alternatively, the holes could be created without removing material, and instead simply using the object to push the material outwardly from the centre of the hole. As another alternative, the holes may be formed by way of a laser beam.

The term "fold line" is used to describe any line of a blank about which the blank is folded. The fold line may be defined by a line of weakness to assist with the folding action. Alternatively, a fold can be formed without the presence of a weakening line, depending for example on the pliability of the blank material and other material characteristics.

The invention is defined in the claims. However, below there is provided a non-exhaustive list of non-limiting examples. Any one or more of the features of these examples may be combined with any one or more features of another example, embodiment, or aspect described herein.

Example Ex1: A hinge-lid container for consumer articles, the container defining an inner surface and an outer surface and comprising:

a box for housing the consumer articles;

a lid hinged to the box along a hinge and being moveable between a closed position and an active position about the hinge;

the hinge comprising an weakening line realized on the outer surface, the weakening line having a width between 0.1 millimetres and 1 millimetre;

an electric conductive trace provided on the outer surface, the weakening line passing through and interrupting the electric conductive trace;

wherein the electric conductive trace forms a closed circuit when the lid is in the active position and the electric conductive trace forms an open circuit when the lid is in the closed position.

Example Ex2: The container according to Example Ex1, wherein the container is at least partly formed by folding one piece of blank.

Example Ex3: The container according to Example Ex2, wherein the lid and the body are formed by folding the same blank.

Example Ex4: The container according to Example Ex2 or Example Ex3, wherein the blank has a thickness comprised between 200 micrometres and 400 micrometres.

Example Ex5: The container according to any of Examples Ex2 to Ex4, wherein the blank comprises a cellulose-fibre-based blank.

Example Ex6: The container according to one or more of the preceding Examples, comprising a back wall having a thickness, the weakening line being formed in the back wall, and wherein the weakening line has a depth comprised between 20 percent and 80 percent of the thickness of the back wall.

Example Ex7: The container according to one or more of the preceding Examples, comprising an energy source and one or more of the following loads:

a light source;

a sensor;

an antenna;

a heating element;

an acoustic emitter;

and wherein the electric conductive trace, when forming a closed circuit, connects the energy source to the electric load.

Example Ex8: The container according to one or more of the preceding Examples, wherein the electric conductive trace has a grammage comprised between 1 gram per square metre and 50 grams per square metre.

Example Ex9: The container according to one or more of the preceding Examples, wherein the electric conductive trace has a width comprised between 0.1 millimetres and 25 millimetres.

Example Ex10: The container according to one or more of the preceding Examples, comprising a back wall and a top wall, and wherein the electric conductive trace is printed on the back wall or on both of the back wall and the top wall.

Example Ex11: The container according to one or more of the preceding Examples, wherein the weakening line has a length longer than 0.1 millimetres.

Example Ex12: The container according to one or more of the preceding Examples, wherein the electric conductive trace interrupted by the weakening line defines a gap by a leading edge of the electric conductive trace and a tailing edge of the electric conductive trace.

Example Ex13: The container according to Ex12, wherein the width of the gap is smaller than the width of the weakening line.

Example Ex14: A method to form a hinge-lid container for consumer articles, the method comprising the following steps:

providing a container blank defining an outer surface and an inner surface, wherein the blank comprises a box portion for forming a box and a lid portion for forming a lid;

forming a weakening line on the outer surface having a width of between 0.1 millimetres and 1 millimetre, the weakening line forming a hinge for the lid so that the lid is movable from a closed position to an active position on the box;

providing an electric conductive trace on the outer surface, including providing the electric conductive trace across the weakening line;

folding the blank to form the hinge-lid container, wherein the electric conductive trace forms a closed circuit when the lid is in the active position and the electric conductive trace forms an open circuit when the lid is in the closed position.

Example Ex15: The method according to Example Ex14, wherein the step of forming the weakening line includes:

ablating the outer surface.

Example Ex16: The method according to Example Ex15, wherein the step of ablating the outer surface includes:

ablating the outer surface by a laser beam.

Example Ex17: The method according to any of Examples Ex14 to Ex16, comprising the step of:

energizing a load when forming the closed circuit.

Example Ex18: The method according to Example Ex17, comprising one or more of the following steps:

switching on a light source when forming the closed circuit;

emitting a sound when forming the closed circuit;

emitting a telecommunication signal when forming the closed circuit;

heating the container when forming the closed circuit;

sensing a parameter when forming the closed circuit.

Example Ex19: The method according to one or more of Examples Ex14 to Ex18, comprising the step of:

providing the container with an energy source.

Example Ex20: The method according to one or more of Examples Ex14 to Ex20, wherein the step of forming a closed circuit from the electric conductive trace when the lid is in the active position includes:

forming an angle smaller than 165 degrees between a lid rear wall a box rear wall of the body.

Examples will now be further described with reference to the Figures in which:

FIGS. 1 to 3 shows a container 10 in accordance with the present invention.

Figure 1:
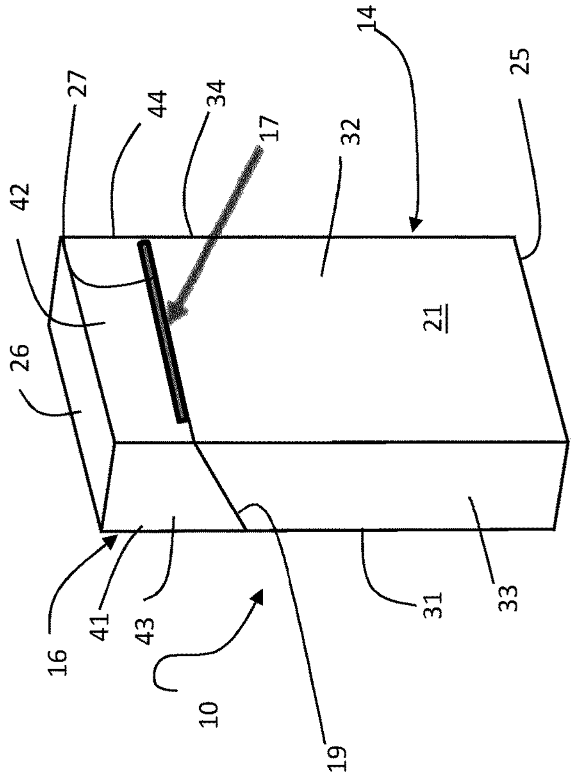
FIG. 1 is a simplified perspective view of a container according to the invention with some element removed and in a closed position.

The container 10 has the shape of a rectangular parallelepiped and includes a box 14 and a lid 16. The box further comprises an hinge 17, allowing the lid to rotate about it. The container 10 defines a back wall 21, a front wall, a left side wall, a right side wall, a bottom wall 25 and a top wall 26.

Figure 3:
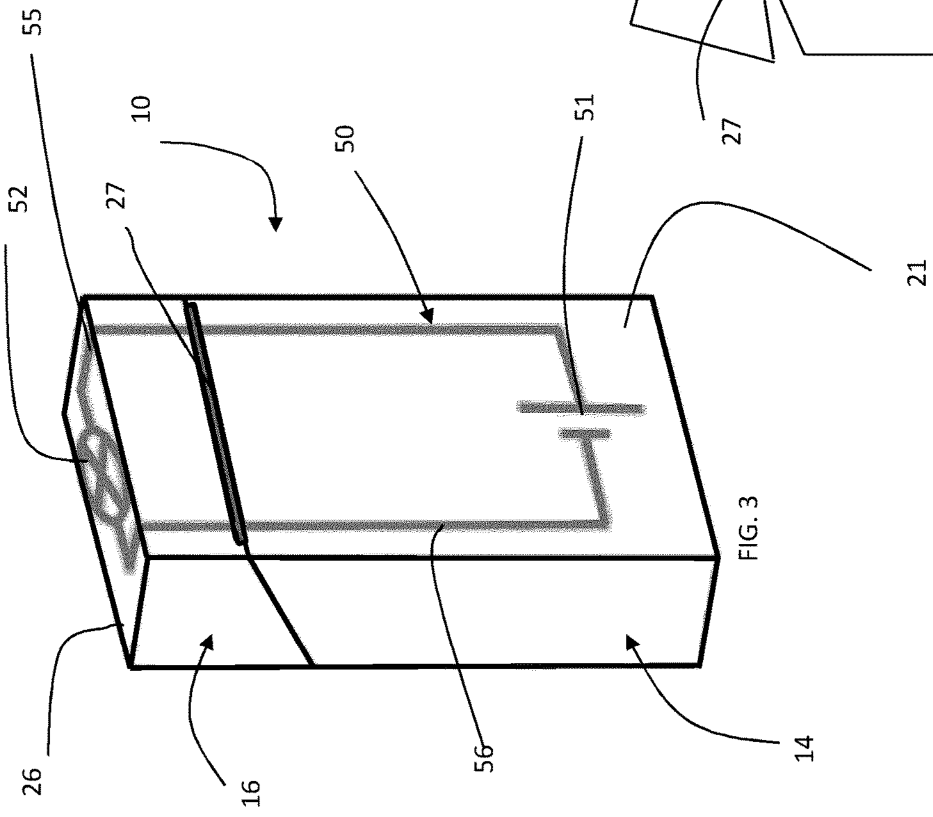
FIG. 3 is a perspective view of the container of FIG. 1 or 2 with more details in a closed position.

The box 14 comprises a box front wall 31, a box rear wall 32, a box base wall (corresponding to the bottom wall 25 of the container), a box left side wall 33 and a box right side wall 34. The lid 16 comprises a lid front wall 41, a lid rear wall 42, a lid top wall (corresponding to the top wall 26 of the container), a lid left side wall 43 and a lid left side wall 44. Lid rear wall 42 and box back wall 32 form the back wall 21 of the container 10. In the position of FIGS. 1 and 3, the lid 16 cover an access opening of the container 10 and the walls of the lid 16 form extensions of the corresponding walls of the box 14.

Further, the container 10 defines an inner volume (not shown) containing for example a group of aerosol generating articles (not shown in the drawings). When the package 10 is closed, the lid 16 and the box 18 defines an opening line 19 which is the separation line between the lid portion and box portion. The opening line 19 is the geometrical continuation of the hinge line 17. The opening line 19 is formed on the left side wall, right side wall and the front wall.

Figure 9:
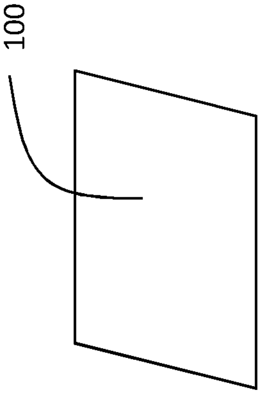
Figure 13:
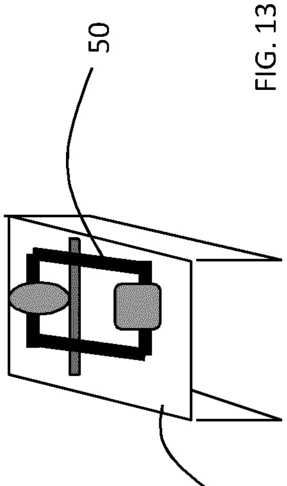
Figure 12:
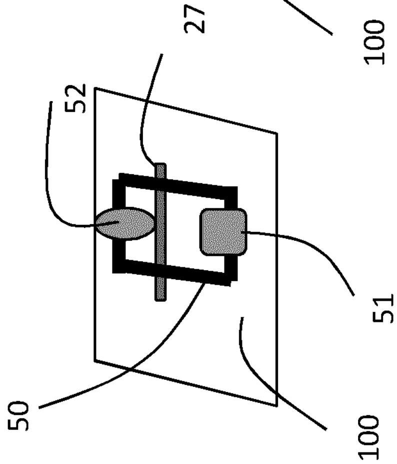

The container 10 is formed from a sheet blank 100 depicted in FIG. 9. The sheet blank 100 comprises a cellulose based layer comprising a cellulosic material. The blank 100 has a thickness 101 (shown in FIGS. 4 and 5), which preferably corresponds to the thickness of the back wall 21 of the container 10.

The container 10 formed by suitably folding the sheet blank 100. The resulting container 10 may then also be wrapped using an outer wrapper in order to form a finished product (not shown) to contain consumer goods (not shown) as aerosol generating articles.

With reference to FIGS. 1 to 8, the hinge line 17 comprises a weakening line 27 realized in the back wall 21. The weakening line 27 is part of the hinge line. The weakening line 27 is preferably an ablated line. Preferably, the weakening line 27 is a straight line. The back wall 21, where the weakening line 27 is formed, is designed to have a minimum residual thickness 102 (visible in FIG. 4) of from 15 percent to about 40 percent of the thickness 101 of the blank 100, and a width 103 of the weakening line equal to between 0.1 millimetres and 1 millimetre. The width 103 of the weakening line 27 is measured when the container 10 is closed, that is, the lid is in a closed position, as in FIGS. 1, 3, 4 and 6.

Figure 4:
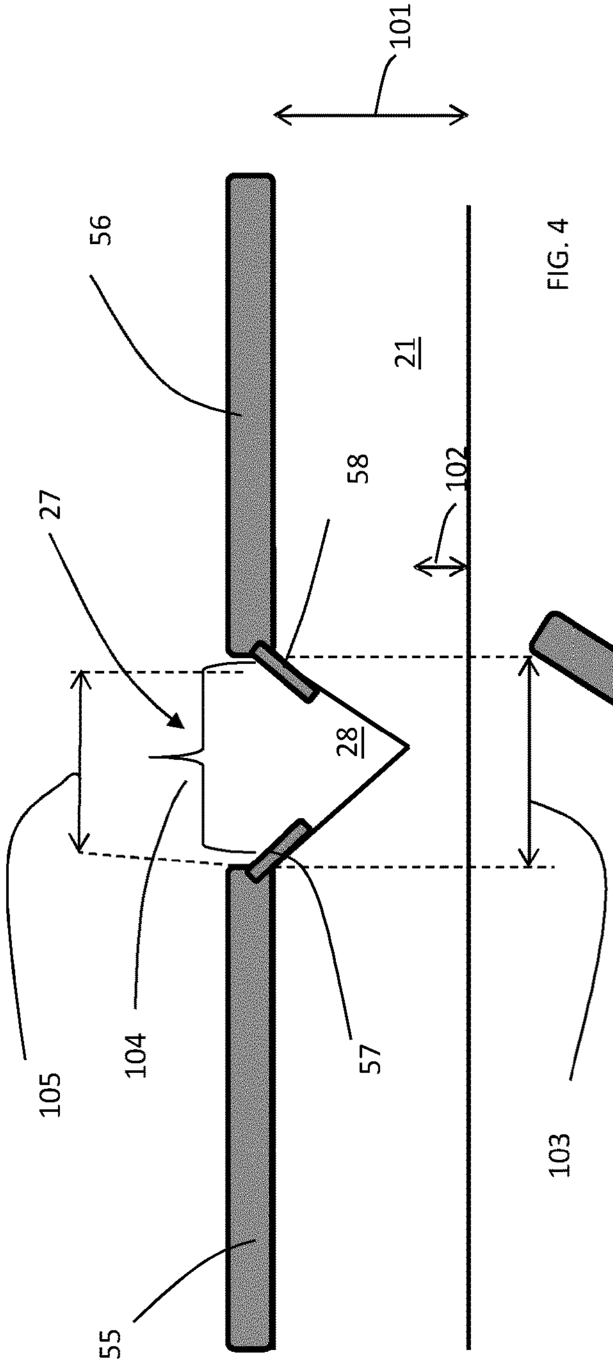
FIGS. 4 and 5 depict a first and a second cross-sectional view of a portion of the container in the positions of FIGS. 1 and 2, respectively.

As shown in FIG. 4, the weakening line 27 defines a groove 28.

Figure 2:
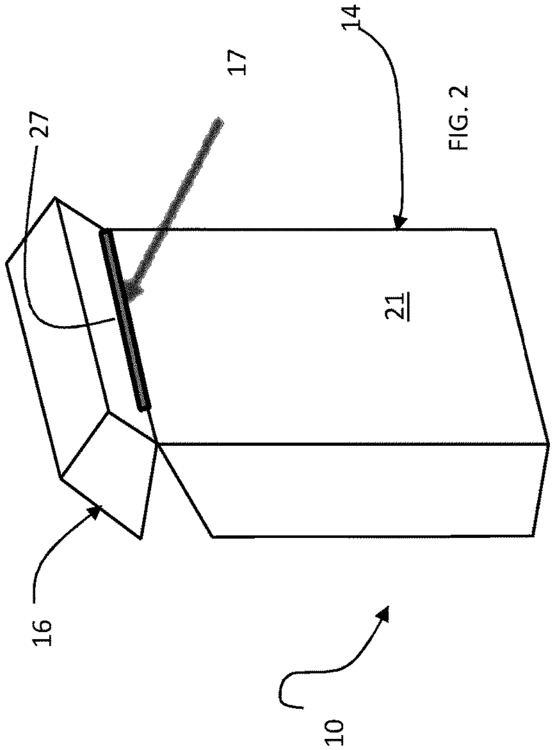
FIG. 2 is a simplified perspective view of the container of FIG. 1 with some element removed and in an active position.

The lid 16 is hinged about the hinge line 17 extending across the back wall 21 of the container 10 and is pivotable between a closed position (shown for example in FIGS. 1 and 3) and an active position (shown for example in FIG. 2). The lid 16 in its movement from the closed position of FIGS. 1 and 3 to the active position of FIG. 2 rotates about the hinge line 17 and thus about the weakening line 27.

Figure 6:
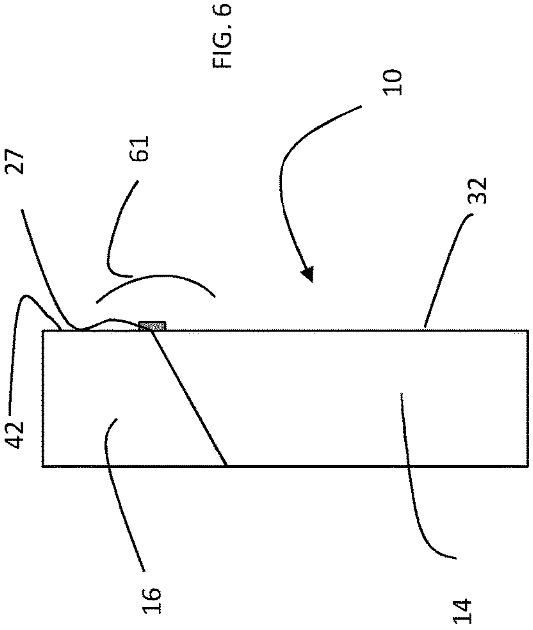
FIGS. 6, 7 and 8 are lateral views of the container of FIGS. 1 to 3 in different positions.

In the closed configuration, as shown in FIG. 6, the lid rear wall 42 and the box rear wall 32 are coplanar. As shown in the side view of FIG. 6, this means that an angle 61 equal to 180 degrees is formed between the lid rear wall 42 and the box rear wall 32.

Figure 5:
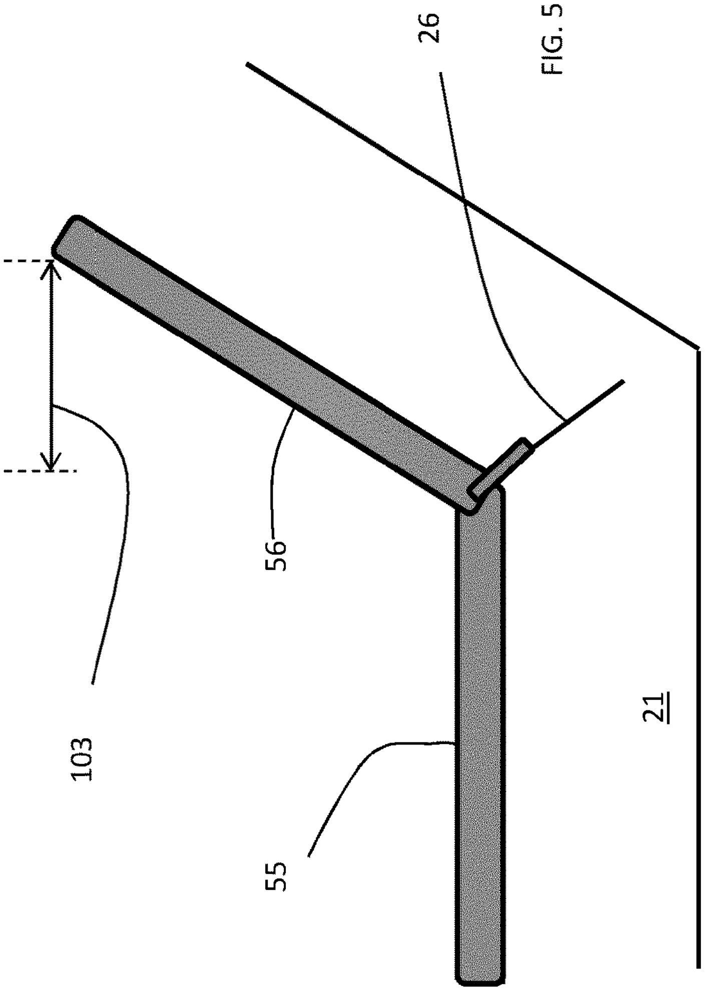
Figure 11:
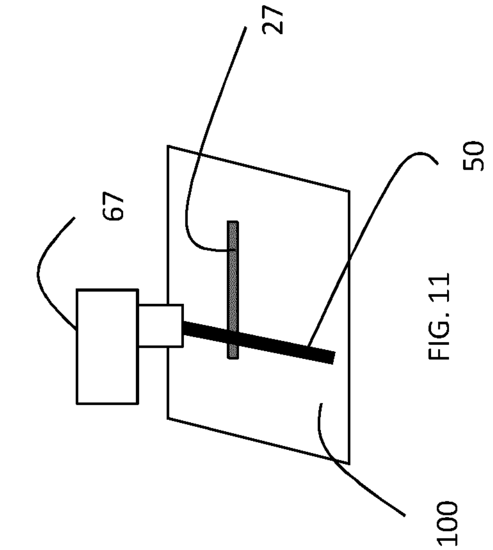
FIGS. 9, 10, 11, 12 and 13 are perspective views of steps of the method for the realization of the container of FIGS. 1 to 3.
Figure 10:
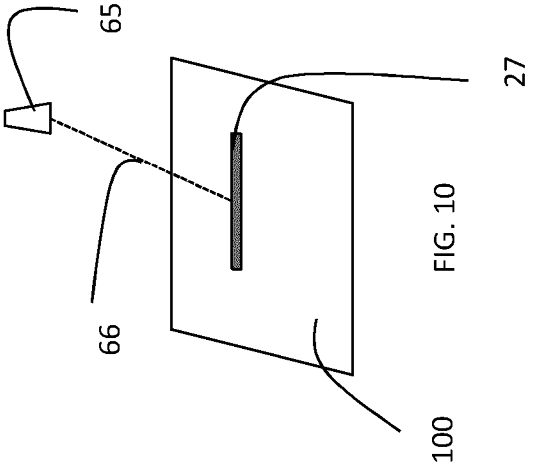

When the container 10 is in the active position, as in FIGS. 2 and 5, the width of the weakening line 27 becomes substantially equal to zero.

In addition to the weakening line 27, an electric conductive trace 50 is formed on the back wall 21 of the container 10. As shown in FIG. 3, the electric conductive trace 50 forms a circuit comprising an energy source 51, such as a battery, and an electric load 52. As shown in FIG. 3, the electric circuit formed by the electric conductive trace 50 is interrupted by the weakening line 27. The weakening line separates the electric circuit in a part 55 realized on the lid 16 and a part 56 on the box 14. The weakening line 27 cuts the circuit in two points.

Therefore, when the lid 16 is in the closed position of FIGS. 1, 3, 4 and 6, the weakening line 27 is interrupting any possible flow of current in the circuit 50. This is clearly visible in the enlarged view of FIG. 4, where the two parts 55, 56 of the circuit are shown separated from each other by the weakening line 27.

Figure 7:
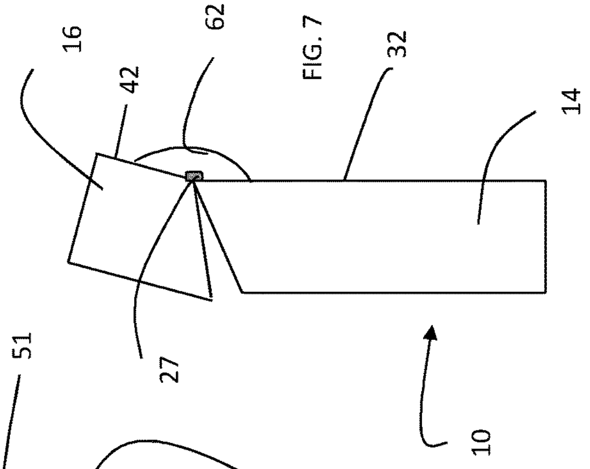

If now the lid 16 is rotated, as shown in FIG. 7, a different angle 62 than a 180 degrees angle between the lid rear wall 42 and the box rear wall 32 is formed. When this angle becomes equal to the first active angle, the lid 16 is said to be in the active position as in FIGS. 2, 5 and 7, and the two parts 55, 56 of the electric conductive trace 50 forming the circuit are in contact (see in particular FIG. 5), the circuit 50 is closed and the load 52 may be energized by the energy source 51.

Part 55 defines a leading edge 57 of the electric conductive trace 50, and the part 56 defines a tailing edge 58 of the electric conductive trace. The tailing edge and the leading edge 57, 58 are portions of the electric conductive trace 50 that tipped over the groove 28, entering partially in the same.

In the closed position of FIG. 4, the two parts 55, 56 of the circuit 50, and in particular leading edge and tailing edge 57, 58, form a gap 104 having a width 105 smaller than the width 103 of the weakening line.

When the lid 16 is rotated, then the weakening line 27 is compressed and the dimension of the width 103 decreases. Furthermore, the distance 105 between the two parts 55, 56 of the electric conductive trace 50 is narrower than the width 103, as depicted in FIG. 5, where the lid 16 is in the active position. The leading edge 57 and the tailing edge 58 come into contact with each other closing the gap 104. The contact between the first and second part 55, 56 of the circuit is increased due to the presence of the leading and tailing edge 57, 58.

Figure 8:
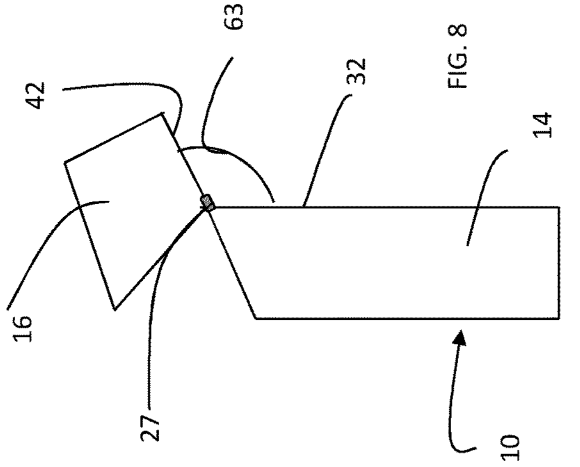

As shown in FIG. 8, the lid 16 can be further rotated about the weakening line to reach the open position, where the articles contained in the container 10 can be accessed by a user. In this open position, an angle 63 is formed between the lid rear wall 42 and the box rear wall 32. Preferably, the angle 63 is smaller than the first active angle 62.

In the following, with reference to FIGS. 9 to 13, a method to form container 10 is detailed. The blank 100 is provided. The blank 100 is known in the field and it is for example made of cardboard (see FIG. 9). A laser 65 is also provided. The laser 65 emits a laser beam 66 on the blank 100. The laser beam 66 is moved above the blank 100 in order to form the ablated line 27 having the suitable dimensions and depth (see FIG. 10). A printing head 67 is then provided. The printing head 67 prints the electric conductive trace 50 on the blank. The shape of the electric conductive trace 50 is such that a circuit is formed (see FIGS. 11 and 12). The electric conductive trace 50 is also printed above the ablated line 27. The ink forming the electric conductive trace 50 may tip over into the groove 28 partly (see FIG. 4). However, the groove 28 when the blank is planar and not folded is interrupting the circuit 50.

After the circuit has been printed, and an energy source 51 and a load 52 are also preferably provided (see again FIG. 12), the blank 100 is suitably folded as known in the art (see the partial folding of FIG. 13) in order to form the container of FIG. 3.

The invention claimed is:

1. A hinge-lid container for consumer articles, the hinge-lid container defining an inner surface and an outer surface and comprising:

a box configured to house the consumer articles;

a lid hinged to the box along a hinge and being moveable between a closed position and an active position about the hinge, the hinge comprising a weakening line realized on the outer surface, the weakening line having a width between 0.1 millimetre and 1 millimetre; and an electric conductive trace provided on the outer surface, the weakening line passing through and interrupting the electric conductive trace, wherein the electric conductive trace forms a closed circuit when the lid is in the active position and the electric conductive trace forms an open circuit when the lid is in the closed position.

2. The hinge-lid container according to claim 1, wherein the hinge-lid container is at least partly formed by folding a blank.

3. The hinge-lid container according to claim 2, wherein the lid and the box are formed by folding one piece of blank.

4. The hinge-lid container according to claim 2, wherein the blank has a thickness comprised between 200 micrometres and 400 micrometres.

5. The hinge-lid container according to claim 2, wherein the blank comprises a cellulose-fibre-based blank.

6. The hinge-lid container according to claim 1, further comprising a back wall having a thickness, the weakening line being formed in the back wall, wherein the weakening line has a minimal residual thickness of less than 40 percent of the thickness of the back wall of the hinge-lid container.

7. The hinge-lid container according to claim 1, further comprising an energy source and one or more of the following electric loads: a light source, a sensor, an antenna, a heating element, and an acoustic emitter, wherein the electric conductive trace, when forming a closed circuit, connects the energy source to the one or more electric loads.

8. The hinge-lid container according to claim 1, wherein the electric conductive trace has a grammage comprised between 1 gram per square metre and 50 grams per square metre.

9. The hinge-lid container according to claim 1, wherein the electric conductive trace has a width comprised between 0.1 millimetre and 25 millimetres.

10. The hinge-lid container according to claim 1, wherein the electric conductive trace interrupted by the weakening line defines a gap by a leading edge of the electric conductive trace and a tailing edge of the electric conductive trace, a width of the gap being smaller than a width of the weakening line.

11. A method of forming a hinge-lid container for consumer articles, the method comprising the steps of:

providing a container blank defining an outer surface and an inner surface, the container blank comprising a box portion for forming a box and a lid portion for forming a lid;

forming a weakening line on the outer surface having a width of between 0.1 millimetre and 1 millimetre, the weakening line forming a hinge for the lid portion so that the lid portion is movable from a closed position to an active position on the box;

providing an electric conductive trace on the outer surface, including providing the electric conductive trace across the weakening line; and folding the container blank to form the hinge-lid container, wherein the electric conductive trace forms a closed circuit when the lid portion is in the active position and the electric conductive trace forms an open circuit when the lid portion is in the closed position.

12. The method according to claim 11, wherein the step of forming the weakening line on the outer surface includes ablating the outer surface.

13. The method according to claim 12, wherein the step of ablating the outer surface includes ablating the outer surface by a laser.

14. The method according to claim 11, further comprising the step of energizing a load when forming the closed circuit.

15. The method according to claim 11, further comprising the step of providing the hinge-lid container with an energy source.

16. The method according to claim 11, wherein the lid portion comprises a lid rear wall and the box comprises a box rear wall, and wherein the step of forming the closed circuit from the electric conductive trace when the lid is in the active position includes forming an angle smaller than 165 degrees between the lid rear wall and the box rear wall.

* * * * *